United States Patent
Nakazawa

(10) Patent No.: US 11,816,519 B2
(45) Date of Patent: Nov. 14, 2023

(54) CODE DISPLAY MEDIUM, INFORMATION PROCESSING APPARATUS, METHOD, AND MEDIUM

(71) Applicant: Rakuten Group, Inc., Tokyo (JP)

(72) Inventor: Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/895,216

(22) Filed: Aug. 25, 2022

(65) Prior Publication Data

US 2023/0064139 A1 Mar. 2, 2023

(30) Foreign Application Priority Data

Aug. 31, 2021 (JP) ................................ 2021-141030

(51) Int. Cl.
*G06K 19/06* (2006.01)
*G05B 19/12* (2006.01)

(52) U.S. Cl.
CPC ..... *G06K 19/06037* (2013.01); *G05B 19/128* (2013.01); *G06K 19/06159* (2013.01)

(58) Field of Classification Search
CPC ....... G06K 19/06037; G06K 19/06159; G05B 19/128
See application file for complete search history.

(56) References Cited

U.S. PATENT DOCUMENTS

| | | | |
|---|---|---|---|
| 2008/0061145 A1* | 3/2008 | McGushion | G06Q 10/08 29/407.04 |
| 2008/0115589 A1* | 5/2008 | DeRose | F16B 31/02 73/761 |
| 2008/0319570 A1* | 12/2008 | Van Schoiack | B25B 21/00 700/110 |
| 2022/0356889 A1* | 11/2022 | Schaeffer | G06K 19/06121 |

FOREIGN PATENT DOCUMENTS

| | | |
|---|---|---|
| EP | 0 706 146 A2 | 4/1996 |
| GB | 2511591 A | 9/2014 |
| JP | 8-77289 A | 3/1996 |
| JP | 2002-239939 A | 8/2002 |
| JP | 2013-138757 A | 7/2013 |
| JP | 2014-170446 A | 9/2014 |
| JP | 2020-186925 A | 11/2020 |

* cited by examiner

Primary Examiner — Laura A Gudorf
(74) Attorney, Agent, or Firm — Sughrue Mion, PLLC

(57) ABSTRACT

A code display medium includes a code image display portion which arranges a plurality of code images side by side in a circumferential direction around an axis of screw fastening and which displays the plurality of code images so as to be optically readable, each of the plurality of code images including identification information for identifying at least one of a fastening material for the screw fastening and/or an object to be fastened by the screw fastening and a fixing portion which fixes the code image display portion to a position that is on the object to be fastened and that can be simultaneously captured with the fastening material in a state where the screw fastening is performed.

16 Claims, 11 Drawing Sheets

CODE DISPLAY MEDIUM, INFORMATION PROCESSING APPARATUS, METHOD, AND MEDIUM

CROSS-REFERENCE TO RELATED APPLICATION

This application is based upon and claims the benefit of priority of Japanese Patent Application No. 2021-141030, filed on Aug. 31, 2021, the entire contents of which are incorporated herein by reference.

FIELD

The present disclosure relates to a technique for inspecting a fastening part.

BACKGROUND

Conventionally, various techniques for inspecting a fastening part have been proposed (refer to Japanese Patent Application Publication No. 2002-239939, Japanese Patent Application Publication No. 2014-170446, and Japanese Patent Application Publication No. 2020-186925). In addition, various techniques related to deformed code images have been proposed (refer to Japanese Patent Application Publication No. H8-77289 and Japanese Patent Application Publication No. 2013-138757).

SUMMARY

In recent years, digital transformation (DX) related to the inspection of fastening parts that constitute a structure such as steel tower has been promoted and various techniques for utilizing a code identifying a fastening part in the inspection of the fastening part have been proposed. However, with conventionally proposed techniques, there is a limit to locations for displaying a code due to reasons such as the code being obscured by a protruding fastening material (a bolt, a nut, or the like) when viewed obliquely and free space for displaying the code around a fastening part being too small.

In consideration of the problem described above, an object of the present disclosure is to display a code for identifying a fastening part without being constrained with respect to a display location and to identify a fastening part using the code.

An example of the present disclosure is a code display medium including: a code image display portion which arranges a plurality of code images side by side in a circumferential direction around an axis of screw fastening and which displays the plurality of code images so as to be optically readable, each of the plurality of code images including identification information for identifying at least one of a fastening material for the screw fastening and/or an object to be fastened by the screw fastening; and a fixing portion which fixes the code image display portion to a position that is on the object to be fastened and that can be simultaneously captured with the fastening material in a state where the screw fastening is performed.

In addition, another example of the present disclosure is an information processing apparatus including a processor to: acquire a captured image in which the code display medium having been fixed to the object to be fastened, the fastening material fastened to the object to be fastened, and the object to be fastened are simultaneously captured; detect the code image from the captured image; acquire the identification information for identifying at least one of the fastening material and/or the object to be fastened by decoding the code image; and determine installation condition of a fastening part based on images of the fastening material and the object to be fastened that are included in the captured image.

The present disclosure can be comprehended as an information processing apparatus, a system, a method executed by a computer, or a program which a computer is caused to execute. In addition, the present disclosure can also be comprehended as a recording medium from which a computer, a device, a machine or the like can read such a program. In this case, the recording medium that is readable by a computer or the like refers to a recording medium which stores information such as data or a program by an electric, magnetic, optical, mechanical, or chemical function and which can be read by a computer or the like.

According to the present disclosure, a code for identifying a fastening part can be displayed without being constrained with respect to a display location and a fastening part can be identified using the code.

DESCRIPTION OF EMBODIMENTS

Figure 1:
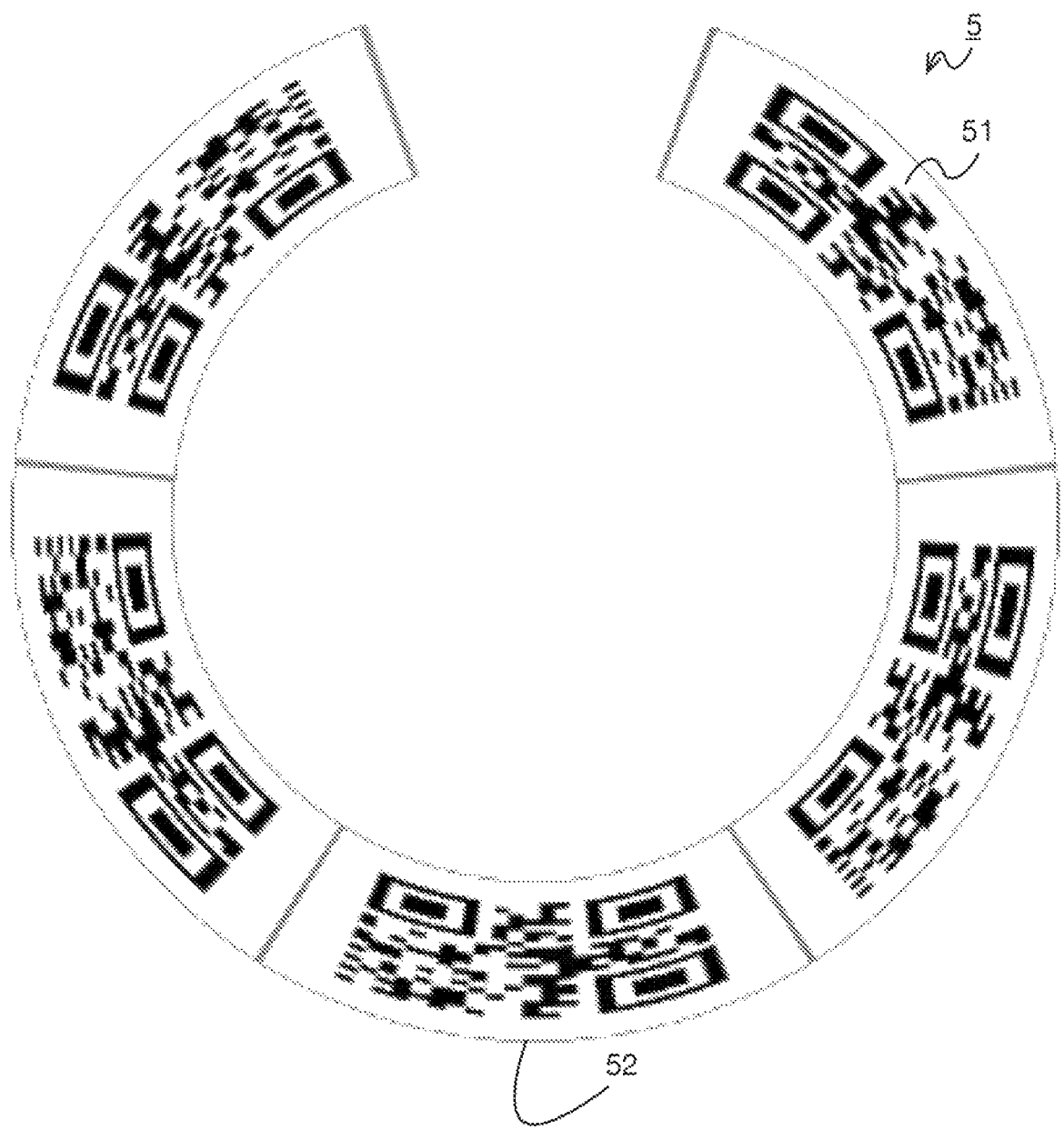
FIG. 1 is a diagram showing a configuration of a code display medium according to an embodiment.

Embodiments of a code display medium, an information processing apparatus, a method, and a program according to the present disclosure will be described with reference to the drawings. However, it should be noted that the embodiments described below merely represent examples of implementing the present disclosure and are not intended to limit the code display medium, the information processing apparatus, the method, and the program according to the present disclosure to the specific configurations described below. When implementing the present disclosure, a specific configuration may be adopted as deemed appropriate in accordance with a mode of implementation and various improvements and modifications may be made.

In the present embodiment, a description will be given of an embodiment in a case where the technique according to the present disclosure is implemented for the purpose of installing, inspecting, and managing a fastening part constituting a structure such as a steel tower. However, the technique according to the present disclosure can be widely used for the purpose of installing, inspecting, and managing a fastening part, and an object of application of the present disclosure is not limited to the example presented in the embodiment. In addition, while an example of using a bolt, a nut, and a washer as fastening materials for screw fastening will be described in the present embodiment, fastening materials to which the technique according to the present disclosure can be applied are not limited to those exemplified in the present disclosure. For example, a screw that does not require the use of a nut or a washer can also be used as a fastening material to which the technique according to the present disclosure can be applied.

In recent years, digital transformation (DX) related to the inspection of fastening parts that constitute a structure such as steel tower has been promoted. In the DX, for example, an inspection technique that takes full advantage of image capture processing and image analysis of a fastening part has been proposed. The inspection technique is expected to have an effect of reducing time and labor for manual work related to the inspection of fastening parts, and, at the same time, identification of each fastening part and detection of abnormalities are expected to be readily realized. However, conventionally proposed techniques are plagued by various problems including a restriction on placement locations of a code display medium due to reasons such as the code being obscured by a protruding fastening material (a bolt, a nut, or the like) when viewed obliquely or free space for fixing the code around a fastening part being too small, an increase in the number of components, and a requirement of positional data for management.

In consideration of such circumstances, the code display medium, the information processing apparatus, the method, and the program according to the present embodiment are capable of providing DX related to the inspection of a fastening part which is less restricted in terms of placement locations, which can be realized with a small number of components, and which does not require a large amount of data to perform an inspection.

Configuration of Code Display Medium

FIG. 1 is a diagram showing a configuration of a code display medium 5 according to the present embodiment. The code display medium 5 according to the present embodiment includes a code image display portion 51 and a fixing portion 52 provided on a rear surface of the code image display portion 51.

The code image display portion 51 arranges a plurality of code images side by side in a circumferential direction around an axis of screw fastening and displays the plurality of code images so as to be optically readable. The plurality of code images are images of codes, each including identification information for identifying at least one of a fastening material 7 for the screw fastening and/or an object to be fastened 6 by the screw fastening. With the code display medium 5 according to the present disclosure, arranging a plurality of code images, each including identification information, side by side enables the identification information to be acquired from any of the code images even when some code becomes unreadable due to staining or the like. In the present embodiment, a code image is generated by encoding data including identification information into a so-called two-dimensional bar code. However, a format of a code when implementing the technique according to the present disclosure is not limited, and a so-called one-dimensional bar code, a circular bar code, a character string, or the like may be adopted as a code.

While an example in which the code image display portion 51 displays a plurality of code images that are the same will be described in the present embodiment, each of the plurality of code images need only include a same piece of identification information and the code images may differ from one another. For example, the code images may be mutually different images due to the images including information other than the identification information or the code images may be mutually different images due to the code images using different encoding methods.

The fixing portion 52 fixes the code image display portion 51 to a position (in other words, a vicinity of the fastening material 7) that is on the object to be fastened 6 and that can be simultaneously captured with the fastening material 7 in a state where the screw fastening is performed. In the present embodiment, by adopting an adhesive surface as the fixing portion 52, the code display medium 5 is configured as a whole as a sticker and a fixing operation of the code display medium 5 during installation is simplified. However, specific fixing means that can be adopted is not limited to that exemplified in the present embodiment, and various fixing means can be adopted, including: bonding the code image display portion 51 to the object to be fastened using adhesives (including reactive adhesives and non-reactive adhesives such as pressure-sensitive adhesive); directly applying or printing the code image display portion 51 on the object to be fastened; directly engraving (laser engraving) or branding the code image display portion 51 on the object to be fastened; fitting the code image display portion 51 to a fitted part provided on the object to be fastened; and mechanically coupling the code image display portion 51 to the object to be fastened.

Figure 2:
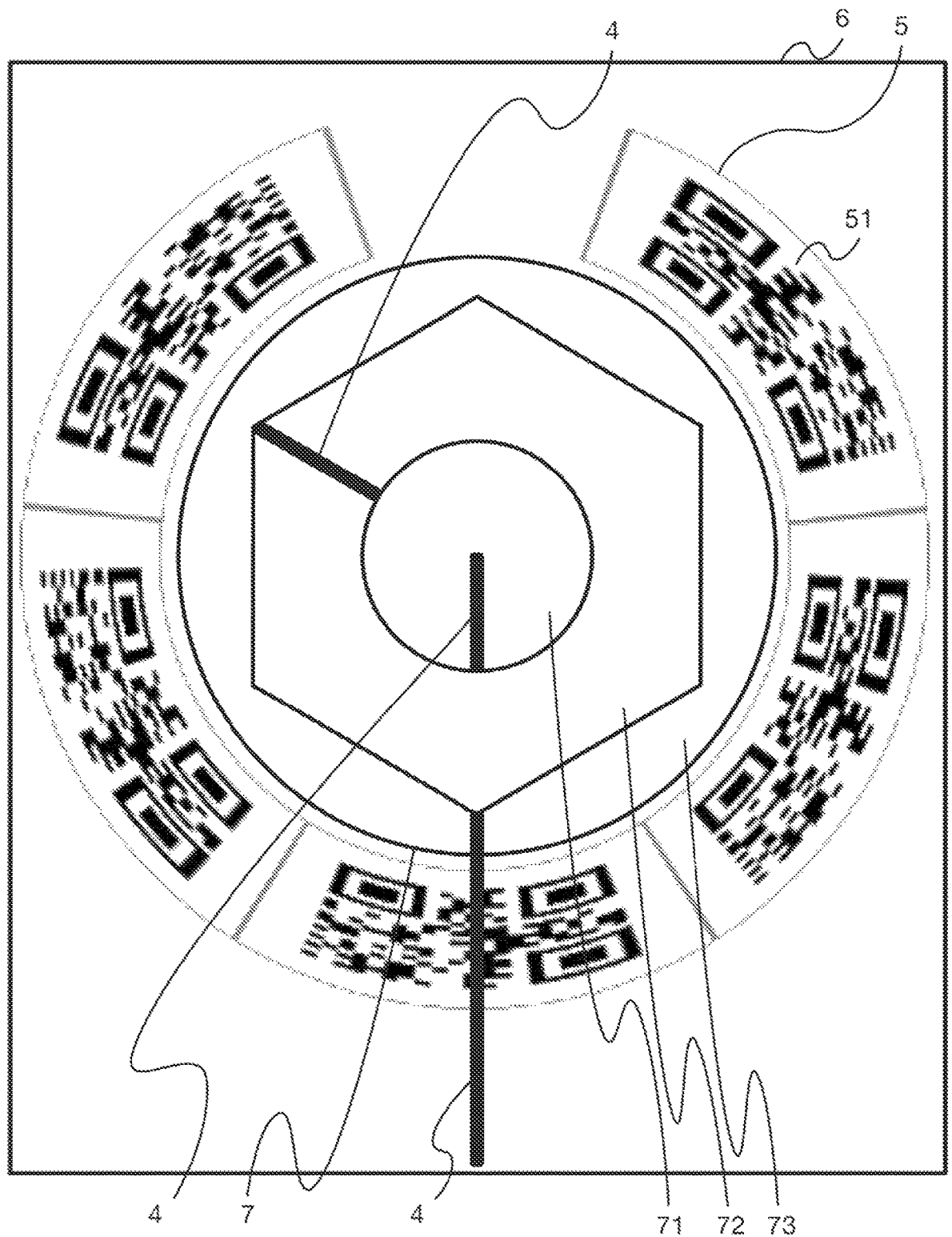
FIG. 2 is a plan view showing a fastening part in a state where the code display medium according to the embodiment has been fixed to an object to be fastened and installation has been properly completed.
Figure 3:
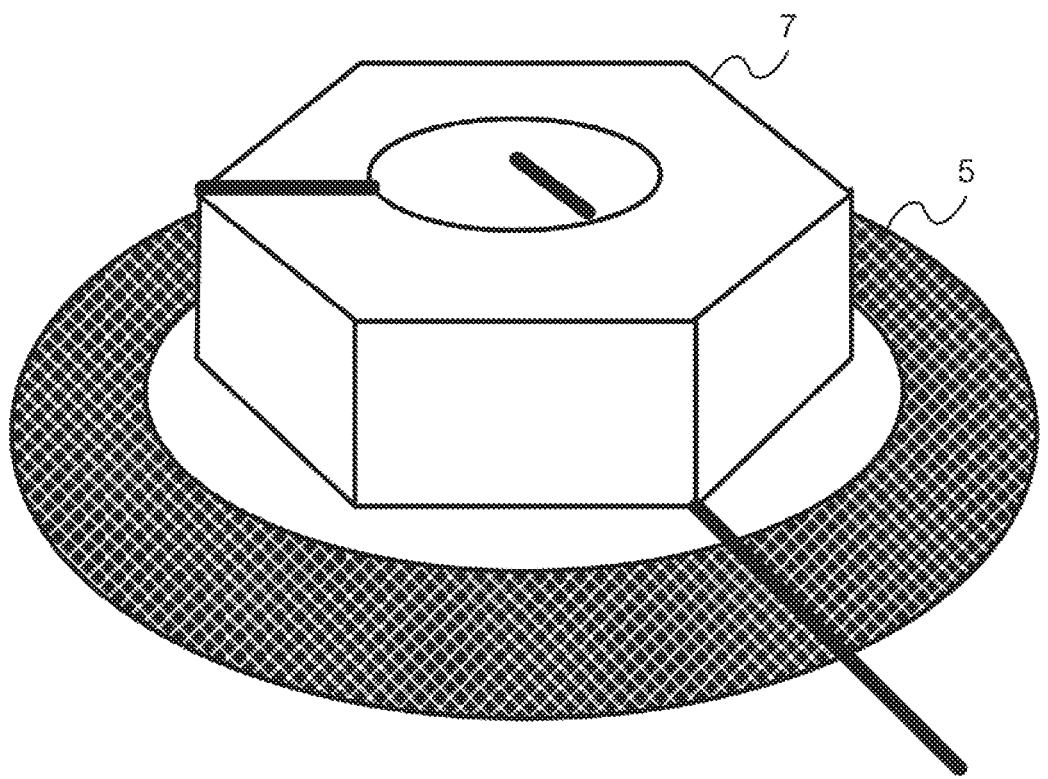
FIG. 3 is a perspective view showing a fastening part in a state where the code display medium according to the embodiment has been fixed to an object to be fastened and installation has been properly completed.

FIGS. 2 and 3 are a plan view and a perspective view showing a fastening part in a state where the code display medium 5 according to the present embodiment has been fixed to the object to be fastened 6 and installation has been properly completed. In the present embodiment, the code image display portion 51 has an arc-shape that surrounds a part of the fastening material 7 or a donut shape that surrounds the entire fastening material 7. More specifically, in the present embodiment, the code image display portion 51 has a shape constituted of at least a part of a region sandwiched between a first arc that is large enough to surround a part of or an entirety of the fastening material 7 and a second arc with a larger diameter than the first arc. While the code image display portion 51 surrounds most of the fastening material 7 in the example shown in FIG. 2, the code image display portion 51 need only have a shape that surrounds the entirety of or a part of the fastening material 7. FIG. 3 shows that, by adopting the code display medium 5 according to the present disclosure and arranging a plurality of code images, each including identification information, side by side in a circumferential direction, the identification information can be acquired from any of the unobscured code images even when some code becomes obscured by the fastening material 7 when viewed obliquely.

Figure 4:
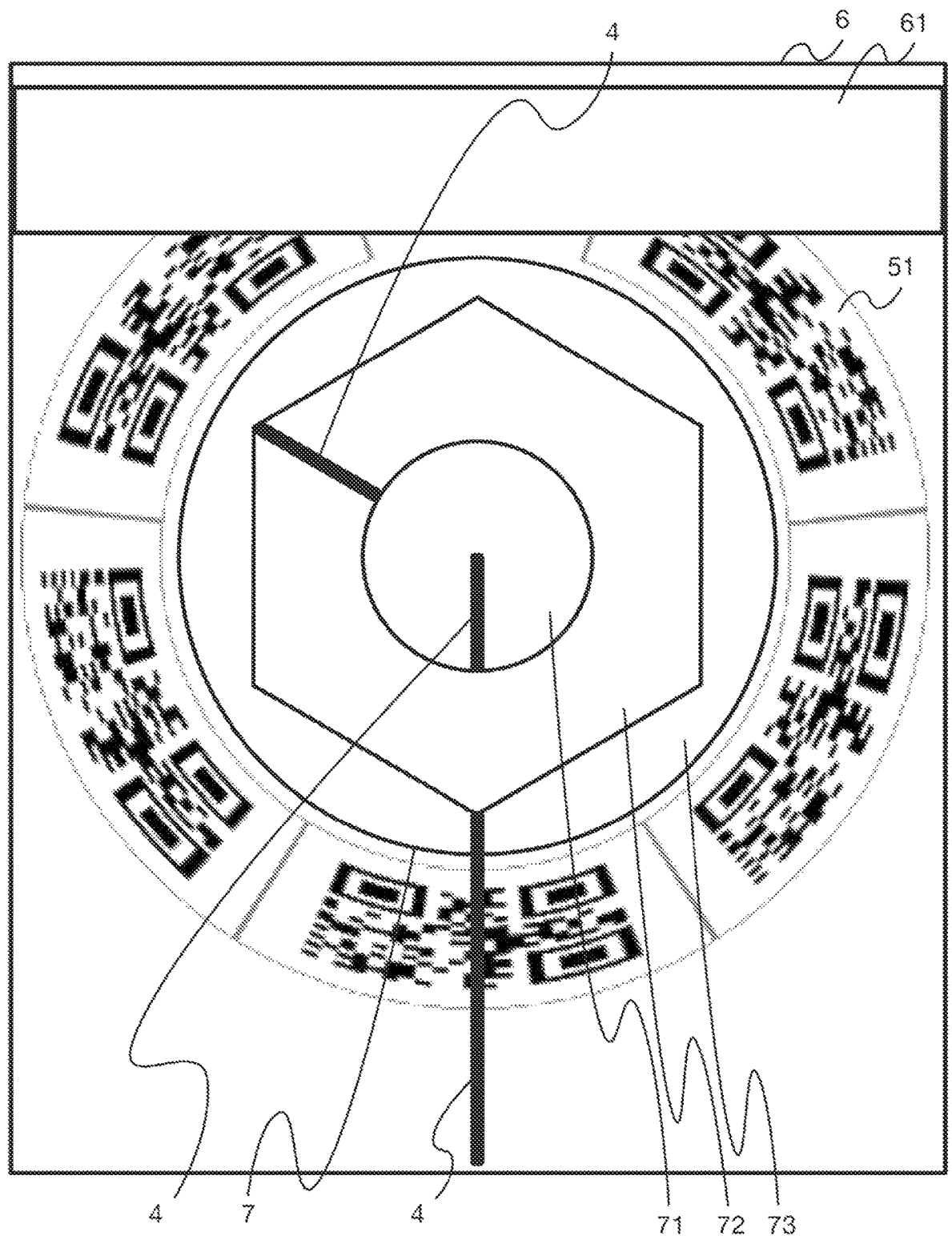
FIG. 4 is a diagram showing a fastening part in a state where the code display medium according to the embodiment has been fixed to an object to be fastened and a part of the code display medium has been cut away according to a shape of a periphery of the fastening part.

FIG. 4 is a diagram showing a fastening part in a state where the code display medium 5 according to the present embodiment has been fixed to the object to be fastened 6 and a part of the code display medium 5 has been cut away according to a shape of a periphery of the fastening part (in the example shown in FIG. 4, a wall 61). In other words, the code display medium 5 according to the present embodiment can be cut according to a shape of a periphery of the fastening part before or after fixing the code display medium 5 to the object to be fastened 6. Even if some code image is cut away, with the code display medium 5 according to the present embodiment, since a code image including identification information is displayed in plurality in the code image display portion 51, there is no interference in reading the code in an inspection processing described later and the code display medium 5 can be used in various installation locations.

Figure 5:
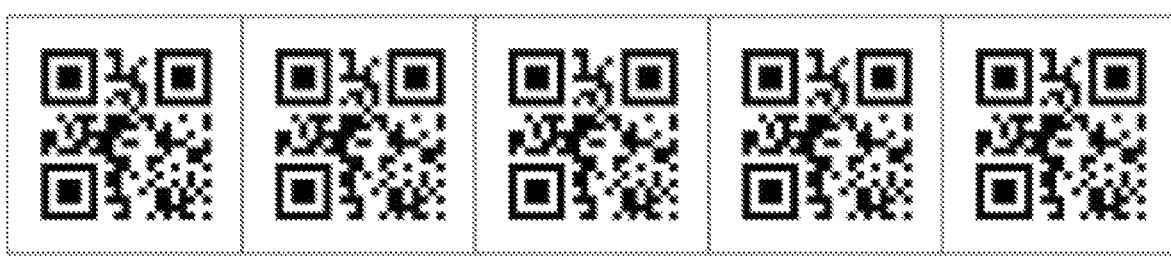
FIG. 5 is a diagram showing a plurality of code images in orthogonal coordinates before being subjected to polar coordinate transformation according to the embodiment.

FIG. 5 is a diagram showing a plurality of code images in orthogonal coordinates before being subjected to polar coordinate transformation according to the present embodiment. In the present embodiment, with an arbitrary point on an axis in a state where the code image display portion is fixed to a predetermined position by the fixing portion 52 (in the present embodiment, an intersection of a code image display surface of the code image display portion 51 and the axis) as an origin, the code image display portion 51 displays a code image having been subjected to a polar coordinate transformation based on the origin (refer to FIG. 1). Subjecting the code image to a polar coordinate transformation according to a shape of a code display portion enables the code image to be displayed across the entire code display medium 5 as shown in FIG. 1 (in other words, a display area of the code image can be widened), and the code image can be readily recognized from a captured image to be described later.

Installation Procedure

Figure 6:
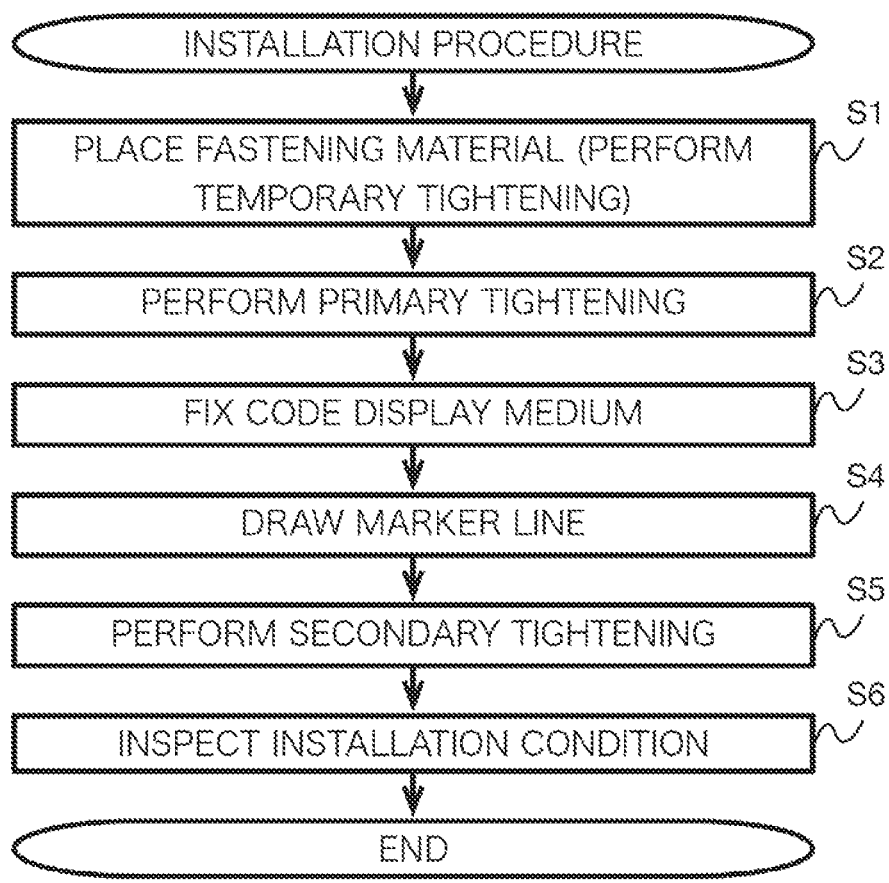
FIG. 6 is a flow chart showing an installation procedure of a fastening part using a code display medium according to the embodiment.

FIG. 6 is a flow chart showing an installation procedure of a fastening part using the code display medium 5 according to the present embodiment. While an installation procedure for fastening the object to be fastened 6 using a bolt 71, a nut 72, and a washer 73 as the fastening material 7 will be described in the present embodiment, installation using other fastening materials for screw fastening is generally similar with the exception of a possible change of a part of the procedure in accordance with a type of the fastening material.

A worker places the fastening material 7 and temporary tightens the fastening material 7 with respect to the object to be fastened 6 (step S1), and performs primary tightening at a primary tightening torque determined in accordance with a standard of the fastening material 7 (step S2). In addition, the worker fixes the code display medium 5 to the object to be fastened 6 so as to surround the periphery of the fastening material 7 (step S3). In doing so, the code display medium 5 is favorably fixed so that a center of gravity of the code display medium 5 (when the shape of the code display medium 5 is an arc, a center of the arc) coincides with an axis of the fastening material 7 (an axis of the bolt 71). In addition, as described above, the code display medium 5 can be cut according to the shape of the periphery of the fastening part before or after fixing the code display medium 5 to the object to be fastened 6.

Furthermore, the worker puts markings for reference display on the bolt 71, the nut 72, the washer 73, and the object to be fastened 6 in a state of being subjected to primary tightening (step S4). Reference display refers to a display for visualizing a relative angle in a rotation of the bolt 71, the nut 72, the washer 73, and the object to be fastened 6 and, generally, in a state where primary tightening has been completed, a single straight line (hereinafter, referred to as a "marker line") 4 which passes all of the bolt 71, the nut 72, the washer 73, and the object to be fastened 6 is drawn with a pen or the like from a center of a screw thread of the bolt 71 toward the outside. In doing so, the marker line 4 for the object to be fastened 6 may be drawn so as to transverse (obscure) a code image on the code display portion. With the code display medium 5 according to the present disclosure, since a plurality of codes are displayed in the code display portion, even if one of such codes is made unreadable by the marker line 4, it does not interference with the identification of the fastening part.

Once the code display medium 5 has been fixed and the marker line 4 has been drawn, the worker performs secondary tightening (final tightening) (step S5). Specifically, the worker performs secondary tightening on the nut 72 so that the angle of the nut 72 with respect to the bolt 71, the washer 73, and the object to be fastened 6 in the state of primary tightening is within a predetermined range in a tightening rotation direction of the nut 72.

Once secondary tightening is completed, an inspection of installation condition is performed based on a captured image obtained by imaging an installed part (step S6). In a state where installation up to secondary tightening has been properly completed, an angle (hereinafter, referred to as a "marker angle") formed between the marker line 4 drawn on the bolt 71, the washer 73, and the object to be fastened 6 and the marker line 4 drawn on the nut 72 is within a range of a predetermined positive angle in the tightening rotation direction of the nut 72 (refer to FIG. 2). Therefore, in the inspection of installation condition, the marker angle is calculated based on the captured image obtained by imaging the installed part and a determination is made as to whether or not the calculated marker angle is within a predetermined angle in the tightening rotation direction of the nut 72. Details of the inspection processing will be provided later with reference to a flow chart.

System Configuration

Figure 7:
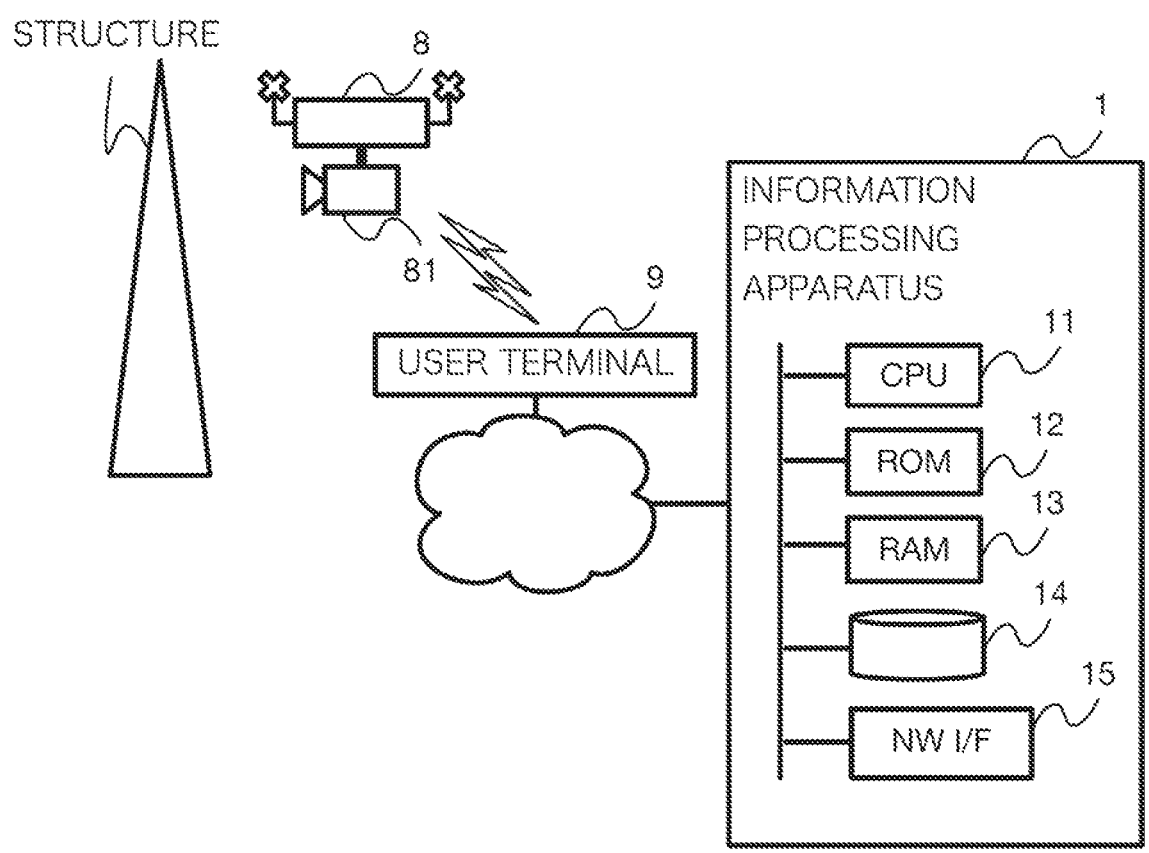
FIG. 7 is a schematic view showing a configuration of a system according to the embodiment.

FIG. 7 is a schematic view showing a configuration of a system according to the present embodiment. The system according to the present embodiment includes an information processing apparatus 1, a drone 8, and a user terminal 9 which are capable of communicating with each other by being connected to a network.

The information processing apparatus 1 is a computer including a central processing unit (CPU) 11, a read only memory (ROM) 12, a random access memory (RAM) 13, a storage device 14 such as an electrically erasable and programmable read only memory (EEPROM) or a hard disk drive (HDD), a communication unit 15 such as a network interface card (NIC), and so forth. However, it should be noted that, with respect to a specific hardware configuration of the information processing apparatus 1, components may be omitted, replaced, or added as deemed appropriate in accordance with a mode of implementation. In addition, the information processing apparatus 1 is not limited to an apparatus made of a single housing. The information processing apparatus 1 may be realized by a plurality of devices using so-called cloud technology or distributed computing technology or the like.

The drone 8 is a small, unmanned aerial vehicle of which flight is controlled in accordance with an input signal from the outside and/or a program recorded in an apparatus, and which includes a propeller, a motor, a CPU, a ROM, a RAM, a storage device, a communication unit, an input device, and an output device (not illustrated). However, it should be noted that, with respect to a specific hardware configuration of the drone 8, components may be omitted, replaced, or added as deemed appropriate in accordance with a mode of implementation. In addition, the drone 8 according to the present embodiment includes an imaging device 81, and when flying around an object structure, the drone 8 images a fastening part in accordance with an input signal from the outside and/or a program recorded in an apparatus.

The user terminal 9 is a terminal apparatus to be used by a user. The user terminal 9 is a computer including a CPU, a ROM, a RAM, a storage device, a communication unit, an input device, and an output device (not illustrated). However, it should be noted that, with respect to a specific hardware configuration of the user terminal 9, components may be omitted, replaced, or added as deemed appropriate in accordance with a mode of implementation. In addition, the user terminal 9 is not limited to an apparatus made of a single housing. The user terminal 9 may be realized by a plurality of apparatuses using so-called cloud technology or distributed computing technology. A user uses various services provided by the system according to the present embodiment via such user terminals 9.

Figure 8:
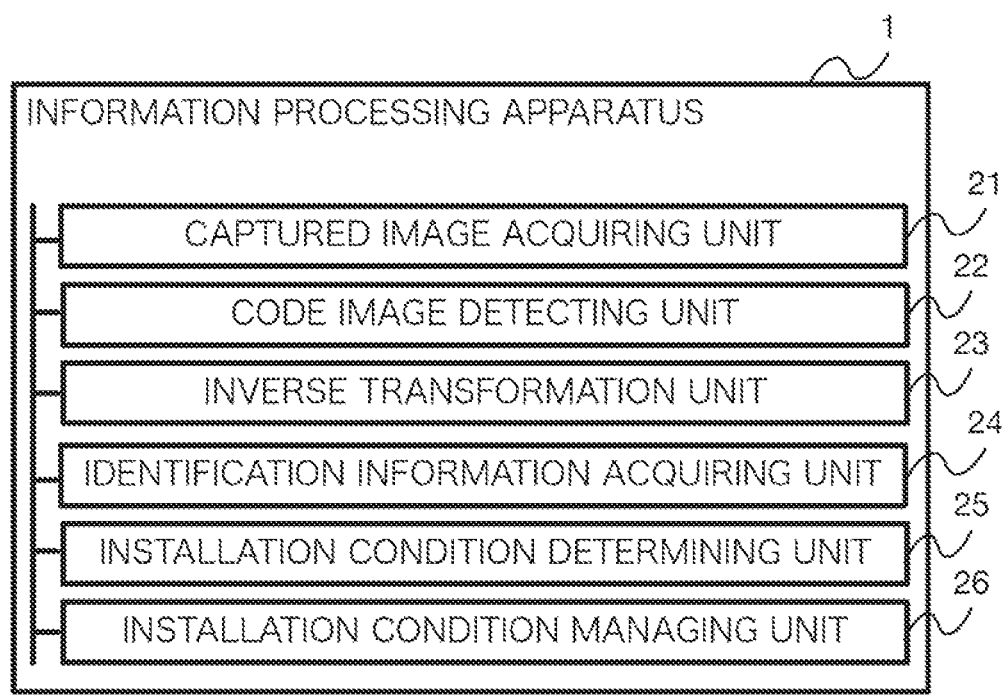
FIG. 8 is a diagram showing an outline of a functional configuration of an information processing apparatus according to the embodiment.

FIG. 8 is a diagram showing an outline of a functional configuration of the information processing apparatus according to the present embodiment. In the information processing apparatus 1, a program recorded in the storage device 14 is read into the RAM 13 and executed by the CPU 11 and each hardware provided in the information processing apparatus 1 is controlled, and the information processing apparatus 1 thereby functions as the information processing apparatus which includes a captured image acquiring unit 21, a code image detecting unit 22, an inverse transformation unit 23, an identification information acquiring unit 24, an installation condition determining unit 25, and an installation condition managing unit 26. While each function included in the information processing apparatus 1 is to be executed by the CPU 11 that is a general-purpose processor in the present embodiment and in other embodiments to be described later, alternatively, a part of or all of the functions may be realized by one or a plurality of dedicated processors.

The captured image acquiring unit 21 acquires a captured image in which the code display medium 5 fixed to the object to be fastened 6, the fastening material 7 fastened to the object to be fastened 6, and the object to be fastened 6 are simultaneously captured. While a method of acquiring the captured image is not limited, in the present embodiment, an example of acquiring, via the user terminal 9, a captured image having been captured using the drone 8 mounted with the imaging device 81 will be described.

The code image detecting unit 22 detects a code image from a captured image. The code image detecting unit 22 can detect a code image in the captured image by detecting a predetermined feature being displayed in the code image display portion 51 together with a code. As the predetermined feature, in addition to a so-called finder pattern that is used in a two-dimensional bar code, various features can be used. In addition, by setting a display color of an entirety of or a part (for example, a finder pattern) of a code image to a color that differs from the colors of any of the object to be fastened 6 and the fastening material 7 (for example, pink or red when the object to be fastened 6 and the fastening material 7 are in gray), the code image may be made more readily detectable. In this case, the code image detecting unit 22 can detect a code image by detecting a predetermined color from the captured image.

By inversely transforming the code image, which is included in the captured image, which had been subjected to polar coordinate transformation, and which has been further subjected to projection when being captured, the inverse transformation unit 23 obtains a code image (refer to FIG. 5) in orthogonal coordinates prior to the polar coordinate transformation. In the present embodiment, by detecting a predetermined reference image included in the captured image and transforming the captured image so that the reference image assumes a shape designated in advance (a shape prior to being subjected to polar coordinate transformation and projection), the inverse transformation unit 23 inversely transforms the code image included in the captured image. In other words, the predetermined reference image may be an image which has a feature that is detectable from a captured image and which has a shape in which a code image is inversely transformed by transforming a captured image including the reference image so that the reference image assumes a shape designated in advance. As the reference image, for example, a finder pattern included in a two-dimensional bar code may be used or a predetermined reference image (refer to FIG. 10) which is prepared separately from a code image and which is to be displayed in the code image display portion 51 may be used as in a variation to be described later.

As the inverse transformation processing by the inverse transformation unit 23, inverse transformation processing may be adopted which obtains, from a code image having been subjected to polar coordinate transformation and having been further subjected to projection when captured, the code image prior to being subjected to polar coordinate transformation by one step of transformation processing or inverse transformation processing may be adopted which obtains the code image prior to being subjected to polar coordinate transformation by a plurality of steps of transformation processing such as initially performing a projective transformation to a planar image to cancel the projection with respect to a code image having been subjected to polar coordinate transformation and having been further subjected to projection when captured and subsequently performing an orthogonal coordinate transformation to cancel the polar coordinate transformation. A specific type of inverse transformation processing may be appropriately selected in accordance with circumstances such as a calculation amount. When the distortion of the code image included in the captured image is small, there may be cases where a part of or all of the processing by the inverse transformation unit 23 can be omitted and, accordingly, the part of or all of the processing may be omitted in accordance with embodiments.

The identification information acquiring unit 24 acquires identification information for identifying at least one of the fastening material 7 and/or the object to be fastened 6 by decoding a code image. Since a specific method of acquiring identification information from a code image differs depending on code formats and a specific method can be appropriately adopted in accordance with an adopted code format, a description thereof will be omitted. When a character string is adopted as the code format, identification information may be acquired by optical character recognition (OCR).

The installation condition determining unit 25 determines installation condition of a fastening part based on images of the fastening material 7 and the object to be fastened 6 included in the captured image. In the present embodiment, the installation condition determining unit 25 determines installation condition based on the reference display given to the fastening material 7 and the object to be fastened 6. In the present embodiment, the marker line 4 is used as the reference display. Specifically, the installation condition determining unit 25 detects a marker line 4 from a captured image, calculates a marker angle formed between the marker line 4 drawn on the bolt 71, the washer 73, and the object to be fastened 6 and the marker line 4 drawn on the nut 72, and determines whether or not the calculated marker angle is within a range of a predetermined positive angle in the tightening rotation direction of the nut 72. As a result of the determination, when the marker angle is within a range of a predetermined positive angle in the tightening rotation direction of the nut 72, the installation condition determining unit 25 determines that it is in a properly installed condition. On the other hand, as a result of the determination, when the marker angle is outside of the range of a predetermined positive angle in the tightening rotation direction of the nut 72, the installation condition determining unit 25 determines that it is not in a properly installed condition (improper installation or looseness due to aging has occurred).

In this case, in order to correctly calculate a marker angle, it is desirable that cancellation of projection is properly performed even with respect to surfaces to which a reference display has been given and which are on the fastening material 7 and the object to be fastened 6, respectively. Since each of the marker lines 4 drawn on the bolt 71, the nut 72, the washer 73, and the object to be fastened 6 is on a different plane, when an inverse transformation for properly canceling the projection of the code image is applied to the entire captured image and a marker angle is calculated based thereon, there is a possibility that an inaccurate marker angle may be calculated. Therefore, when there is a possibility that projections of the marker lines 4 respectively drawn on the fastening material 7 and the object to be fastened 6 significantly differ from each other (for example, when using a captured image taken from a short distance), it is desirable that a plane related to each marker line 4 is extracted and a projection is properly canceled. However, when a difference between projections of the marker lines 4 respectively drawn on the fastening material 7 and the object to be fastened 6 is relatively small (for example, when using a captured image taken from a long distance), and if the marker angle is within a predetermined range and is acceptable, a strict cancellation of projections may be omitted by setting a permissible angle range premised on an error due to the projection.

As a method of detecting a plane of the nut 72 on which a marker line has been drawn, a method can be adopted involving detecting three or more vertices of a polygon (a hexagon in the case of a hex nut) constituting an upper face of the nut 72 by image recognition and defining, based on the detected vertices, the plane of the nut 72 on which a marker line has been drawn. When it is difficult to directly detect the vertices by image recognition, each side of the polygon constituting the upper face of the nut 72 can be detected and intersections of the detected sides can be handled as vertices.

The installation condition managing unit 26 manages installation condition of one or a plurality of fastening parts included in a structure by accumulating, in association with each other, identification information acquired by the identification information acquiring unit 24 and installation condition determined by the installation condition determining unit 25. In addition, as installation condition, the installation condition managing unit 26 may further accumulate a marker angle calculated by the installation condition determining unit 25 together with information indicating whether or not it is in a properly installed condition.

Flow of Processing

Next, a flow of processing to be executed by the information processing apparatus according to the present embodiment will be described. It is to be understood that specific contents and processing sequences of the processing described below merely represent one example of implementing the present disclosure. Specific processing contents and processing sequences may be selected as deemed appropriate in accordance with embodiments of the present disclosure.

Figure 9:
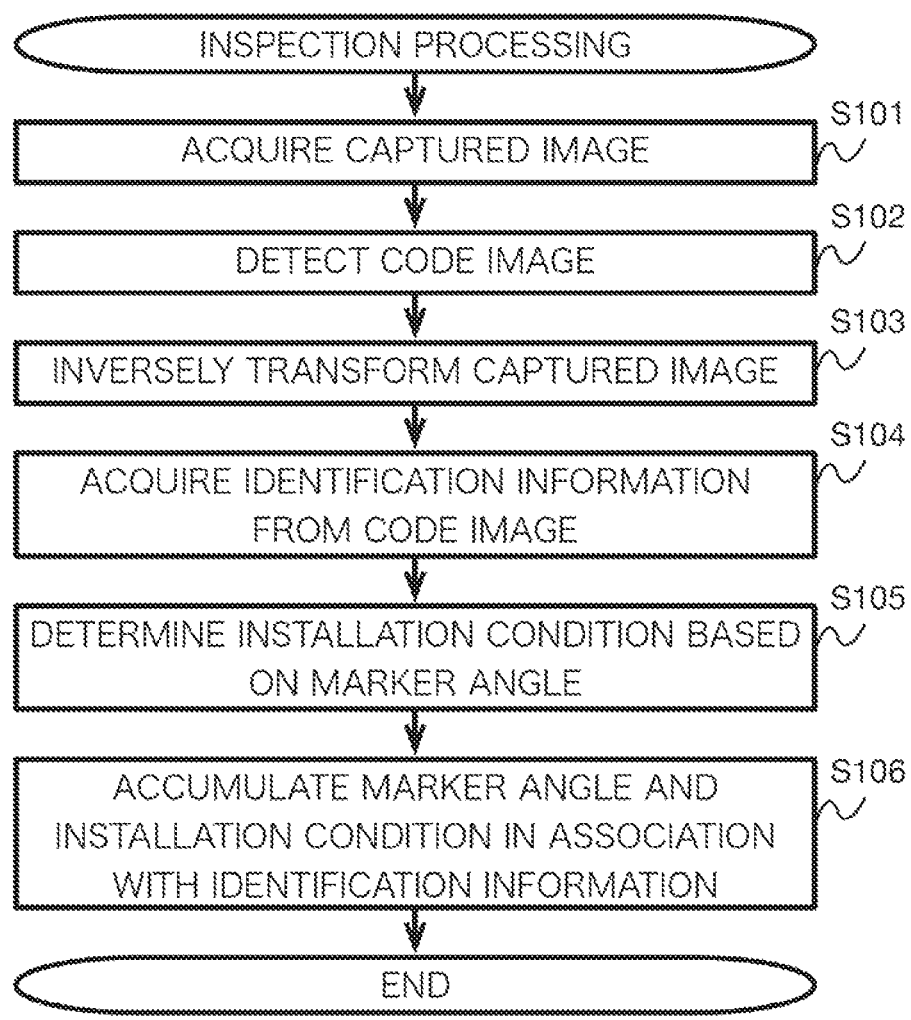
FIG. 9 is a flow chart showing a flow of inspection processing according to the embodiment.

FIG. 9 is a flow chart showing a flow of inspection processing according to the present embodiment. Execution of the processing shown in the present flow chart is triggered by an input of a captured image or an input by a worker of an instruction to execute inspection processing in the inspection step (step S6) in the installation procedure or in an inspection performed periodically (for example, once every year) after installation.

In step S101, a captured image is acquired. The worker images a fastening part using the imaging device 81 and inputs image data of the obtained captured image to the information processing apparatus 1. In doing so, the worker may perform imaging so that a plurality of fastening parts are included in one captured image. When a plurality of fastening parts are included in one captured image, the inspection processing is executed for each fastening part included in the captured image. While an imaging method and a method of inputting image data to the information processing apparatus 1 are not limited, in the present embodiment, a plurality of fastening parts having been installed on a structure are captured using the drone 8 mounted with the imaging device 81, and image data transferred from the imaging device 81 to the user terminal 9 via communication or a recording medium is further transferred to the information processing apparatus 1 via a network, thereby image data of the captured image being input to the information processing apparatus 1. Once a captured image is acquired by the captured image acquiring unit 21, the processing advances to step S102.

In steps S102 to S104, identification information is acquired from a code image included in the captured image. The code image detecting unit 22 detects the code image from the captured image (step S102), and the inverse transformation unit 23 obtains a code image prior to being subjected to the polar coordinate transformation by applying inverse transformation to the captured image having been subjected to a polar coordinate transformation and having been further subjected to projection when being captured (step S103). In addition, by decoding the code image, the identification information acquiring unit 24 acquires identification information for identifying at least one of the fastening material 7 and/or the object to be fastened 6 (step S104). As described above, when the distortion of the code image included in the captured image is small, there may be cases where a part of or all of the processing of step S103 can be omitted and, accordingly, the part of or all of the processing may be omitted in accordance with embodiments. Once identification information is acquired, the processing advances to step S105.

In steps S105 and S106, installation condition is determined. The installation condition determining unit 25 determines installation condition of a fastening part based on images of the fastening material 7 and the object to be fastened 6 included in the captured image (step S105). Subsequently, the installation condition managing unit 26 manages installation condition of one or a plurality of fastening parts included in a structure by accumulating, in association with each other, identification information acquired in step S104 and a marker angle and installation condition obtained in step S105 (step S106). In addition, the determination result in step S105 may be notified to the user terminal 9. Subsequently, the processing shown in the present flow chart is ended.

Effect

According to the embodiment described above, a code for identifying a fastening part can be displayed without being constrained with respect to a display location and a fastening part can be identified using the code.

Variations

Figure 10:
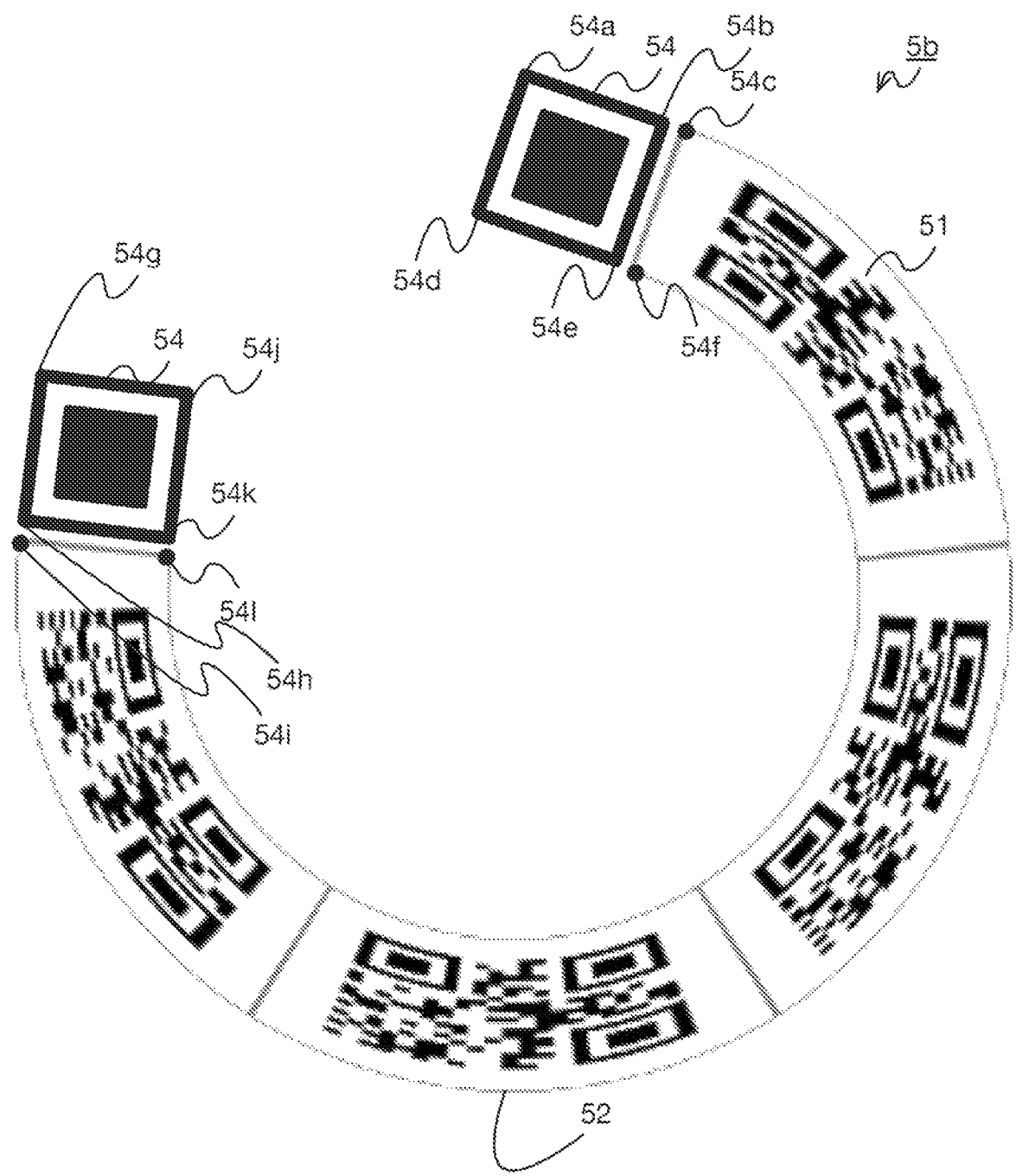
FIG. 10 is a diagram showing a configuration of a code display medium according to a first variation.

FIG. 10 is a diagram showing a configuration of a code display medium 5b according to a first variation. While an example of using a finder pattern included in a two-dimensional bar code as a predetermined feature for detecting a code image and/or a reference image for inverse transformation has been described in the embodiment presented above, other images may be used as the predetermined feature and/or the reference image. In the example shown in FIG. 10, by arranging images 54 resembling a finder pattern of a two-dimensional bar code at both ends of the code image display portion 51 having an arc-like shape, the images 54 are adopted as a predetermined feature for the detection of a code image by the code image detecting unit 22 and, at the same time, the images 54 are adopted as reference images 54 for inverse transformation processing by the inverse transformation unit 23. More specifically, the inverse transformation unit 23 extracts a plurality of reference points 54a to 54l from the reference images 54 and executes inverse transformation processing based on the extracted reference points.

Figure 11:
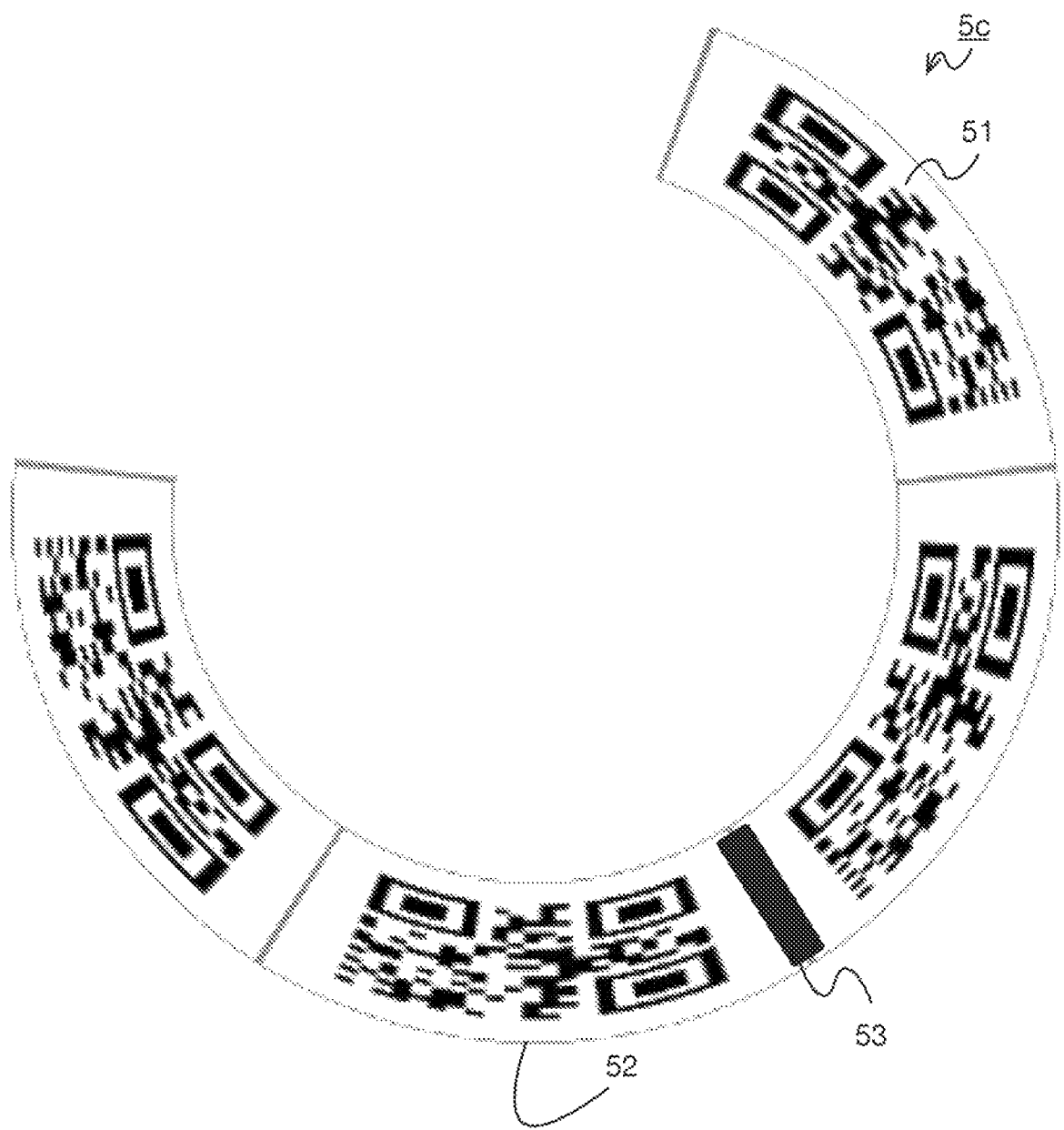
FIG. 11 is a diagram showing a configuration of a code display medium according to a second variation.

FIG. 11 is a diagram showing a configuration of a code display medium 5c according to a second variation. While an example of using an angle formed between the marker line 4 drawn on the bolt 71, the washer 73, and the object to be fastened and the marker line 4 drawn on the nut 72 as a marker angle for determining installation condition has been described in the embodiment presented above, a marker angle may be calculated using other methods. In the example shown in FIG. 11, the code display medium 5c further includes a marker part 53 that enables installation condition to be determined based on a positional relationship with the reference display given to the fastening material 7 (for example, marker lines 4 drawn on the bolt 71, the nut 72, the washer 73, and the object to be fastened by the worker).

In this case, when fixing the code display medium 5c to the object to be fastened, the worker aligns positions of the reference display (the marker line 4 or the like) given to the fastening material 7 and the marker part 53. In addition, in the inspection processing, the installation condition determining unit 25 determines installation condition based on the positional relationship between the reference display given to the fastening material 7 and the marker part 53 included in the code display medium 5c. Specifically, the installation condition determining unit 25 detects the reference display (the marker line 4 or the like) and the marker part 53 from a captured image, calculates a marker angle formed between the detected reference display and the marker part 53, and determines whether or not the calculated marker angle is within a range of a predetermined positive angle in the tightening rotation direction of the nut 72. In other words, in the present variation, the marker part 53 serves as a replacement for a reference display drawn on the object to be fastened in conventional installation.

The various configurations adoptable to code display medium which have been described above with reference to the code display medium 5, 5b, and 5c may be selected and discarded as appropriate and combined with each other in accordance with embodiments. For example, the reference image 54 described with reference to FIG. 10 and the marker part 53 described with reference to FIG. 11 may be used in combination. In addition, an image that doubles as a reference image and a marker part may be used.

Furthermore, while an example of using the marker line 4 drawn by the worker as a reference display has been described in the embodiment presented above, other displays may be used as the reference display. For example, a protrusion, a notch, a print, or the like give to the fastening material 7 such as the bolt 71, the nut 72, or the washer 73 in advance may be used as a reference display. As the fastening material 7 having such a reference display, conventionally, a fastening material 7 is known which has an asymmetric appearance due to being provided with a protrusion or the like in a part thereof and which enables a rotational state to be discerned from an image (for example, a so-called smart bolt). When using the fastening material 7 having a protrusion provided in a part thereof, while there is a possibility that the code image display portion 51 may become obscured by the protrusion in an installed state, since a plurality of codes are displayed in the code display portion with the code display medium according to the present disclosure, even if one of such codes is made unreadable by the protrusion, it does not interfere with the identification of the fastening part. In addition, the code display medium may be fixed so as to cover the protrusion of the fastening material 7 or fixed to a position separated from the protrusion to avoid being obscured by the protrusion.

While a method of using a reference image in a code display medium in an inverse transformation of a captured image has been described in the embodiment presented above, processing of the inverse transformation of a captured image may be performed using other methods. For example, a method may be adopted in which an entirety of or a part of an arc that is a perfect circle in a plan view but an ellipse in a captured image due to projection is extracted from the captured image and the captured image is inversely transformed by ellipse fitting that transforms the extracted arc into a perfect circle. In this case, examples of an arc that is a perfect circle in a plan view but an ellipse in a captured image due to projection include an edge that is a boundary between a code display medium and an object to be fastened (a base plate or the like), an edge of a code display medium (an outer periphery or an inner periphery), an arc printed on a code display medium, and an edge of the fastening material 7 (the washer 73 or the like).

The inverse transformation unit 23 performs ellipse fitting on the assumption that a center of gravity of a code display medium when a 360-degree circumference is assumed and a center of gravity of a fastening part on a surface to which the code display medium has been fixed are approximately consistent and that the center of gravity of the code display medium is known in advance. Since an ellipse estimated from a photographed edge (arc) varies significantly depending on a center of gravity (center), it is desirable that the center of gravity of the code display medium can be obtained from the center of gravity of the fastening part.

The center of gravity of the fastening part on a surface (hereinafter, an "object surface") to which the code display medium is fixed can be estimated from a center of the fastening material 7 such as a center of the screw thread of the bolt 71 or a center of the nut 72 which is specified from a captured image. However, since the center of the fastening material 7 does not exist on the object surface, it should be noted that a different projection has been applied. For example, the inverse transformation unit 23 estimates the center of the fastening material 7 by performing ellipse fitting based on a shape of the fastening material 7 such as the screw thread of the bolt 71 or the nut 72 and estimates the center of gravity of the fastening part on the object surface based on a distance between the estimated center of the fastening material 7 and the object surface. In doing so, since the distance between the center of the fastening material 7 and the object surface is more or less a same distance in accordance with a standard of the fastening material 7 and a shape of the object to be fastened, the distance between the center of the fastening material 7 and the object surface can be stored in advance.

In addition, since the code image included in the captured image has usually been subjected to rotation in addition to projection, simply canceling the projection and canceling the polar coordinate transformation do not result in an erect image. Therefore, when the identification information acquiring unit 24 does not accommodate decoding of a code image that is not erect, the inverse transformation unit 23 may perform a transformation for making the code image erect by rotating the code image in addition to canceling the projection and canceling the polar coordinate transformation.

In addition, while an example of displaying a plurality of code images having been subjected to a polar coordinate transformation in the code image display portion 51 has been described in the embodiment presented above, code images to be displayed in the code image display portion 51 are not limited to those subjected to a polar coordinate transformation. For example, a plurality of code images (in orthogonal coordinates) not having been subjected to a polar coordinate transformation may be displayed in the code image display portion 51. Even in such examples, since a plurality of code images are arranged side by side in a circumferential direction, even when some code becomes obscured by the fastening material 7 such as the bolt 71 or the nut 72 when viewed obliquely or some code becomes unreadable due to staining or the like, identification information can be acquired from any of the code images.

What is claimed is:

1. A code display medium comprising:
    a code image display portion which arranges a plurality of code images side by side in a circumferential direction around an axis of screw fastening and which displays the plurality of code images so as to be optically readable, each of the plurality of code images including identification information for identifying at least one of a fastening material for the screw fastening and an object to be fastened by the screw fastening, wherein the code image display portion displays the plurality of code images having been subject to a polar coordinate transformation based on an origin on the axis in a state where the code image display portion is fixed to a position by a fixing portion; and
    the fixing portion which fixes the code image display portion to the position that is on the object to be fastened and that can be simultaneously captured with the fastening material in a state where the screw fastening is performed.

2. The code display medium according to claim 1, wherein
    the code image display portion displays the plurality of code images that are the same.

3. The code display medium according to claim 1, wherein
    the code image display portion further displays a predetermined reference image to be used as a reference when inversely transforming, after the code image display portion is captured, at least one of the plurality of code images included in a captured image.

4. The code display medium according to claim 1, wherein
    the code image display portion has a shape that surrounds a part of or an entirety of the fastening material.

5. The code display medium according to claim 4, wherein
    the code image display portion has a shape constituted of at least a part of a region sandwiched between a first arc that is large enough to surround a part of or an entirety of the fastening material and a second arc with a larger diameter than the first arc.

6. The code display medium according to claim 4, further comprising
    a marker part which enables installation condition to be determined based on a positional relationship with a reference display given to the fastening material.

7. An information processing apparatus comprising a processor to:
    acquire a captured image in which a code display medium having been fixed to the object to be fastened, the fastening material fastened to the object to be fastened, and the object to be fastened are simultaneously captured, wherein the code display medium comprises:
        a code image display portion which arranges a plurality of code images side by side in a circumferential direction around an axis of screw fastening and which displays the plurality of code images so as to be optically readable, each of the plurality of code images including identification information for identifying at least one of a fastening material for the screw fastening and an object to be fastened by the screw fastening, wherein the code image display portion displays the plurality of code images having been subject to a polar coordinate transformation based on an origin on the axis in a state where the code image display portion is fixed to a position by a fixing portion; and
        the fixing portion which fixes the code image display portion to the position that is on the object to be fastened and that can be simultaneously captured with the fastening material in a state where the screw fastening is performed;
    detect the code image from the captured image;
    acquire the identification information for identifying at least one of the fastening material and the object to be fastened by decoding the code image; and
    determine installation condition of a fastening part based on images of the fastening material and the object to be fastened that are included in the captured image.

8. The information processing apparatus according to claim 7, wherein the processor further inversely transforms the code image included in the captured image to obtain the code image prior to being subjected to a polar coordinate transformation,
    and wherein the processor obtains the identification information by decoding the code image that is inversely transformed.

9. The information processing apparatus according to claim 8, wherein the processor inversely transforms the code image included in the captured image based on a predetermined reference image included in the captured image.

10. The information processing apparatus according to claim 8, wherein the processor inversely transforms the code image included in the captured image based on an arc that is in the captured image and that is a perfect circle in a plan view but an ellipse due to projection.

11. The information processing apparatus according to claim 8, wherein the processor obtains the code image prior to being subjected to a polar coordinate transformation by subjecting the code image included in the captured image to a projective transformation into a planar image and by canceling a polar coordinate transformation of the code image included in the planar image.

12. The information processing apparatus according to claim 7, wherein the processor determines installation condition based on a positional relationship between a reference display given to the fastening material and a marker part included in the code display medium.

13. The information processing apparatus according to claim 12, wherein the processor determines that the fastening material is in a properly installed condition when an angle formed between the reference display given to the fastening material and the marker part included in the code display medium is within a predetermined range.

14. The information processing apparatus according to claim 7, wherein the processor further manages, in association with each other, the acquired identification information and the determined installation condition.

15. An information processing method for causing a computer to execute:
acquiring a captured image in which a code display medium having been fixed to an object to be fastened, a fastening material fastened to the object to be fastened, and the object to be fastened are simultaneously captured, wherein the code display medium comprises:
a code image display portion which arranges a plurality of code images side by side in a circumferential direction around an axis of screw fastening and which displays the plurality of code images so as to be optically readable, each of the plurality of code images including identification information for identifying at least one of a fastening material for the screw fastening and an object to be fastened by the screw fastening, wherein the code image display portion displays the plurality of code images having been subject to a polar coordinate transformation based on an origin on the axis in a state where the code image display portion is fixed to a position by a fixing portion; and
the fixing portion which fixes the code image display portion to the position that is on the object to be fastened and that can be simultaneously captured with the fastening material in a state where the screw fastening is performed;
detecting the code image from the captured image; acquiring identification information for identifying at least one of the fastening material and the object to be fastened by decoding the code image; and determining installation condition of a fastening part based on images of the fastening material and the object to be fastened that are included in the captured image.

16. A non-transitory computer-readable recording medium on which is recorded a program for causing a computer to execute a process comprising:
acquiring a captured image in which a code display medium having been fixed to an object to be fastened, a fastening material fastened to the object to be fastened, and the object to be fastened are simultaneously captured, wherein the code display medium comprises:
a code image display portion which arranges a plurality of code images side by side in a circumferential direction around an axis of screw fastening and which displays the plurality of code images so as to be optically readable, each of the plurality of code images including identification information for identifying at least one of a fastening material for the screw fastening and an object to be fastened by the screw fastening, wherein the code image display portion displays the plurality of code images having been subject to a polar coordinate transformation based on an origin on the axis in a state where the code image display portion is fixed to a position by a fixing portion; and
the fixing portion which fixes the code image display portion to the position that is on the object to be fastened and that can be simultaneously captured with the fastening material in a state where the screw fastening is performed;
detecting the code image from the captured image;
acquiring identification information for identifying at least one of the fastening material and the object to be fastened by decoding the code image; and
determining installation condition of a fastening part based on images of the fastening material and the object to be fastened that are included in the captured image.

* * * * *